United States Patent Office 3,337,562
Patented Aug. 22, 1967

---

3,337,562
SUBSTITUTED 2-PYRRYLKETONES
Marcel Pesson, Paris, France, assignor to Laboratoire Roger Bellon, Neuilly-sur-Seine, France, a French company
No Drawing. Filed July 13, 1964, Ser. No. 382,395
Claims priority, application Great Britain, July 15, 1963, 28,022/63
12 Claims. (Cl. 260—294.7)

The present invention relates to basic derivatives of 2-pyrrylketones in which the nitrogen atom of the pyrrole nucleus is substituted by a carbon chain having a tertiary amino group.

The compounds of the invention have the formula:

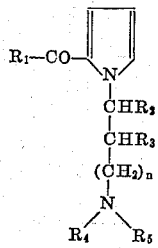

in which $R_1$ represents a hydrogen atom or a straight or branched chain alkyl radical, or an aryl, alkylaryl, arylalkyl, alkoxyaryl or aryloxyalkyl radical, these radicals being optionally substituted by halogen atoms, or a heterocyclic radical, $R_2$ and $R_3$, which are identical or different, represent hydrogen atoms or lower alkyl radicals (i.e. radicals containing 1–5 carbon atoms), $R_4$ and $R_5$, which are identical or different, represent lower alkyl radicals, or together with the nitrogen atom to which they are attached form a heterocyclic ring, and $n$ is 0 or 1. For example $R_4$ and $R_5$ may form with the nitrogen atom a morpholine, pyrrolidone or piperidine ring.

The invention also comprises pharmaceutical compositions comprising as active principle a compound as described above in association with a non-toxic pharmaceutical carrier.

The invention comprises further a process for the preparation of the above compounds in which a halogenated tertiary amine of formula $$\text{Hal}-CHR_2-CHR_3-(CH_2)_n-NR_4R_5$$

(Hal being a halogen atom, preferably chlorine) is reacted with the potassium derivative of a 2-pyrrylketone in accordance with the following diagram:

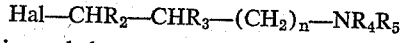

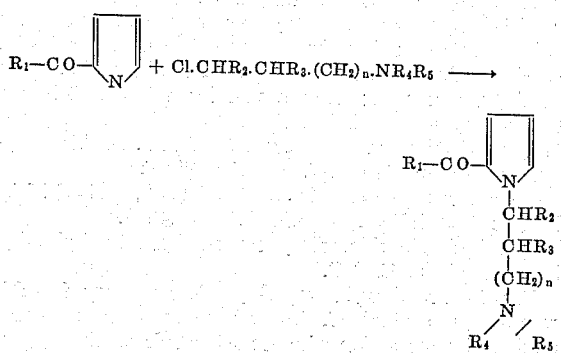

The potassium derivatives of the pyrrole compounds may be obtained by the action of metallic potassium on said pyrrole compounds in a neutral organic solvent. It has been found that the potassium derivatives of the 2-pyrrylketones are conveniently prepared using the potassium derivative of tertiary butyl alcohol. In addition this alcohol may be advantageously employed as a solvent in the condensation of the halogenated tertiary amine with the nitrogen atom of the pyrrole compound.

It is ordinarily preferred to prepare a solution of potassium t-butoxide in t-butyl alcohol by dissolving potassium in the alcohol, and then to add the equivalent quantity of 2-pyrrylketone. The halogenated amine is then added. The mixture is heated in both stages to effect the reaction. Preferably the solution of potassium t-butoxide containing the 2-pyrrylketone is heated under reflux for about 1 hour, and when the halogenated amine has been added, the mixture is again heated under reflux for 2 to 6 hours. Some of the solvent is then driven off by distillation, the residue is taken up in water, and the oil formed is extracted with a solvent such as, for example, diethylether. The organic extract is then re-extracted with a dilute solution of a strong mineral acid. The acid solution so formed is made strongly alkaline by the addition of a mineral base and the oil formed is extracted with an organic solvent. The organic solution is dried, the solvent is evaporated and the remaining oil is purified, generally by distillation under a high vacuum.

The compounds thus obtained are viscous oils distillable without decomposition in vacuo. They tend to become colored if allowed to stand in air in the light. They generally give stable, crystalline salts.

When the alkyl chain of the tertiary amine contains no asymmetric carbon atom, more especially when $R_2$ and $R_3$ are H and $n$ is 0 or 1, only one product is obtained, the salts of which are easy to isolate. On the other hand, where $n=0$ and where the halogen atom of the halogenated tertiary amine used is carried by an asymmetrical carbon atom, the reaction may give two isomeric derivatives and the product isolated may consist either of the one isomer or the other one, or of a mixture of both. In such cases, crystalline salts are difficult to obtain.

By way of illustration, examples of the preparation of the compounds of the invention are hereinafter given.

EXAMPLE 1

*1-beta-dimethylaminoethyl-2-benzoylpyrrole*

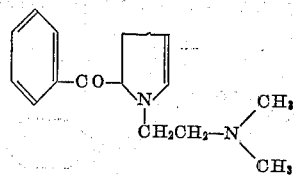

In a 250 cc. two-necked spherical flask having a mechanical stirrer, a dropping funnel and a reflux condenser, provided at its upper end with a soda lime trap, 3.9 g. of potassium are added to 75 cc. of t-butyl alcohol. When the metal has completely dissolved 17.1 g. of 2-benzoylpyrrole are added and the mixture is heated under reflux for 1 hour, and 11 g. of 1-chloro-2-dimethylaminoethane are then added over a period of time of about 10 minutes from the dropping funnel, and the mixture is heated under reflux for 4 hours. The excess of solvent is driven off on the water bath in vacuo. The residue is taken up in 100 cc. of water, and the oil is extracted with 3× 80 cc. of ether. The ethereal solution is extracted with 3× 50 cc. of 2 N hydrochloric acid. The acid solution is made alkaline by the addition of sodium hydroxide solution, the oil formed is extracted with ether, the organic solution is dried over potassium carbonate after filtration, and the solvent is driven off and the residue fractionated under a good vacuum. The oil obtained boils at 135–138° C. under 0.1 mm. Hg. Its analysis gives, for $C_{15}H_{18}N_2O$ (M.W.=242.3):

Calculated: C=74.35%, H=7.49%, N=11.56%.
Found: C=74.33%, H=7.53%, N=11.30%.

Its hydrochloride, recrystallized from methyl ethyl ketone, melts at 166° C.

The substances described in the following examples were prepared by the same method:

EXAMPLE 2

*1-beta-diethylaminoethyl-2-benzoylpyrole*

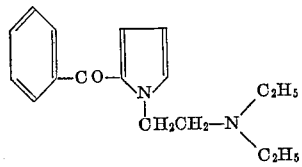

This compound is prepared by the action of 2-diethylamino-1-chloroethane on the potassium derivative of 2-benzoylpyrrole. It is an oil, which boils at 155° C. under a pressure of 0.5 mm. Hg. Its analysis for $C_{17}H_{22}N_2O$ (M.W.=270.36) gives:

Calculated: C=75.52%, H=8.20%, N=10.36%.
Found: C=75.32%, H=8.32%, N=10.31%.

Its hydrochloride melts at 139° C.

EXAMPLE 3

*1-beta-N-morpholylethyl-2-benzoylpyrrole*

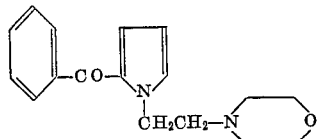

This compound is prepared by the reaction of 1-chloro-2-N-morpholylethane on the potassium derivative of 2-benzoylpyrrole. The oil obtained boils at 175–177° C. under 0.1 mm. Hg. Its analysis for $C_{17}H_{20}N_2O_2$ (M.W.=284.35) gives:

Calculated: C=71.80%, H=7.09%, N=9.85%.
Found: C=72.16%, H=7.25%, N=9.75%.

The hydrochloride, recrystallized from methyl ethyl ketone, melts at 192° C.

EXAMPLE 4

*1-beta-N-piperidylethyl-2-benzoylpyrrole*

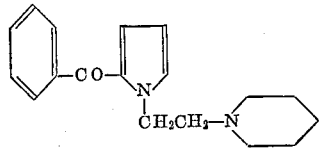

This compound is prepared by the reaction of 1-chloro-2-N-piperidylethane on the potassium derivative of 2-benzoylpyrrole. The oil obtained boils at 168°–170° C. under 0.1 mm. Hg. Its analysis for $C_{18}H_{22}N_2O$ gives:

Calculated: C=76.56%, H=7.85%, N=9.92%.
Found: C=76.25%, H=8.02%, N=10.08.

The hydrochloride, recrystallized from methyl ethyl ketone, melts at 172° C.

EXAMPLE 5

*1-gamma-dimethylaminopropyl-2-benzoylpyrrole*

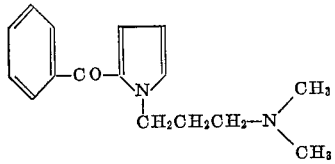

This compound is obtained by condensation of 1-chloro-3-dimethylaminopropane with the potassium derivative of 2-benzoylpyrrole. The oil obtained boils at 144° C. under 0.8 mm. Hg. Its analysis for $C_{16}H_{20}N_2O$ (M.W.=256.34) gives:

Calculated: C=74.96%, H=7.86%, N=10.93%.
Found: C=75.10%, H=7.99%, N=10.99%.

The hydrochloride, recrystallized from methyl ethyl ketone, melts at 146° C.

EXAMPLE 6

12 g. of 1-dimethylamino-2-chloropropane are reacted with the potassium derivative of 2-benzoylpyrrole prepared from 17.1 g. of the latter and a solution of potassium t-butoxide obtained from 3.9 g. of potassium and 75 cc. of t-butyl alcohol. An oil is isolated, which boils at 138° C. under 0.05 mm. Hg. Its analysis for $C_{16}H_{20}N_2O$ (M.W.=256.34) gives:

Calculated: C=74.96%, H=7.86%, N=10.93%.
Found: C=74.97%, H=8.00%, N=10.85%.

For the above-indicated reasons, this product may consist of one or both of the following isomers:

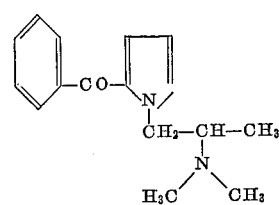

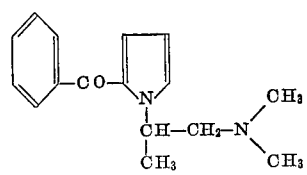

This compound, when treated, in solution in isopropyl alcohol, with citric acid gives a hygroscopic citrate having an ill-defined melting point (about 70° C.). It has not been possible to obtain a crystalline hydrochloride.

EXAMPLE 7

*1-beta-diethylaminoethyl-2-(4-methoxybenzoyl)pyrrole*

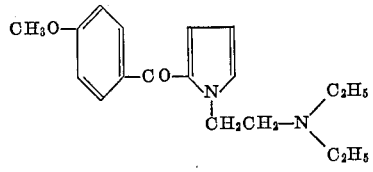

In the apparatus described in Example 1, a solution of potassium t-butoxide in tertiary butanol is prepared, 20.1 g. of 2-(4-methoxybenzoyl)pyrrole are added, the mixture is heated under reflux for 1 hour with stirring, and 13.6 g. of 2-diethylaminochloroethane are finally added. After heating under reflux with stirring for a further 4 hours, the reaction product is isolated as indicated in Example 1. It is an oil boiling at 188° C. under 0.5 mm. Hg. Its analysis for $C_{18}H_{24}N_2O_2$ (M.W.=300.39) gives:

Calculated: C=71.97%, H=8.05%, N=9.33%.
Found: C=71.87%, H=8.28%, N=9.40%.

The hydrochloride, recrystallized from methyl ethyl ketone, melts at 124° C.

The 2-(4-methoxybenzoyl)-pyrrole necessary for this reaction was obtained, in accordance with a known method, by the action of anisoyl chloride on the magnesium derivative of pyrrole. This ketone is a solid compound melting at 112° C. Analysis: $C_{12}H_{11}NO_2$ (M.W.=201.22):

Calculated: C=71.62%, H=5.51%, N=6.96%.
Found: C=71.50%, H=5.75%, N=7.15%.

This ketone was used in the preparation of the compounds described in the following examples:

EXAMPLE 8

1-beta-dimethylaminoethyl - 2 - (4-methoxybenzoyl) pyrrole

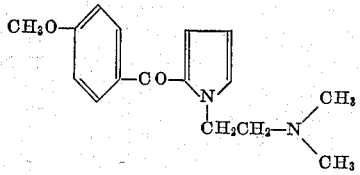

1-chloro-2-dimethylaminoethane was reacted with the potassium derivative of 2-(4-methoxybenzoyl) pyrrole. The product is an oil boiling at 155° C. under 0.08 mm. Hg. Its analysis for $C_{16}H_{20}N_2O_2$ (M.W.=272.34) gives:
Calculated: C=70.56%, H=7.40%, N=10.29%. Found: C=70.57%, H=7.49%, N=10.16%.

Its hydrochloride, recrystallized from isopropanol, melts at 202° C.

EXAMPLE 9

1 - gamma - dimethylaminopropyl - 2 - (4 - methoxybenzoyl) pyrrole

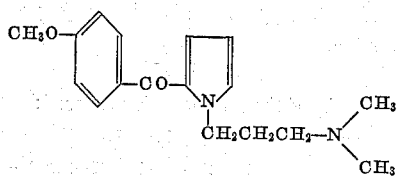

This product was obtained by the action of 1-chloro-3-dimethylaminopropane on 2-(4-methoxybenzoyl)pyrrole. It is an oil boiling at 166° C. under 0.1 mm. Hg. Its analysis for $C_{17}H_{22}N_2O_2$ (M.W.=286.36) gives:
Calculated: C=71.30%, H=7.74%, N=9.78. Found: C=71.10%, H=8.00%, N=9.70%.

Its hydrochloride, recrystallized from isopropanol, melts at 180° C.

EXAMPLE 10

Condensation of 1-dimethylamino-2-chloropropane and 2-(4-methoxybenzoyl)pyrrole gives an oil which melts at 150-155° C. under 0.04 mm. Hg. Its analysis for $C_{17}H_{22}N_2O_2$ (M.W.=286.36) gives:
Calculated: C=71.30%, H=7.74%, N=9.78%. Found: C=74.30%, H=7.90%, N=9.74%.

This substance may consist of either or both of the following isomers:

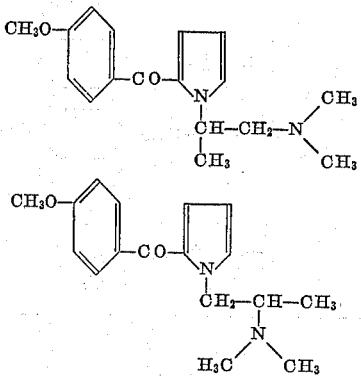

EXAMPLE 11

1 - beta - diethylaminoethyl - 2 - alpha - ethylbutyrylpyrrole

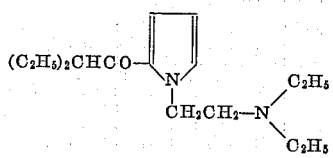

To a solution of potassium t-butoxide prepared in accordance with Example 7 there are added 16.6 g. of 2-alpha-ethylbutyrylpyrrole. After heating and stirring under reflux for 1 hour, 13.6 g. of 1-chloro-2-diethylaminoethane are added in accordance with the aforesaid example and the mixture is heated under reflux with stirring for 4 hours. The reaction product is isolated as before. It is an oil which boils at 105° C. under 0.1 mm. Hg. Its analysis for $C_{16}H_{28}N_2O$ (M.W.=264.4) gives:
Calculated: C=72.68%, H=10.67%, N=10.60%. Found: C=72.73%, H=10.70%, N=10.67.

Its hydrochloride melts at 127° C.

The 2-alpha-ethylbutyrylpyrrole necessary for this synthesis and those described below was prepared in accordance with a known process by the action of diethylacetyl chloride on the magnesium derivative of pyrrole. This ketone is an oil boiling at 90–91° C. under 0.07 mm. Hg. Analysis: $C_{10}H_{15}NO$ (M.W.=165.23):
Calculated: C=72.69%, H=9.15%, N=8.48%. Found: C=72.72%, H=9.30%, N=8.58%.

EXAMPLE 12

1 - beta - dimethylaminoethyl - 2 - alpha - ethylbutyrylpyrrole

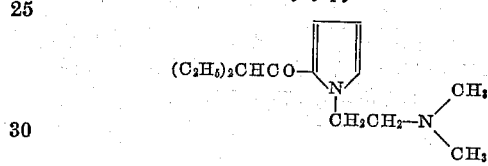

This product is obtained by the action of 1-chloro-2-dimethylaminoethane on 2-alpha-ethylbutyrylpyrrole. The base is an oil which boils at 96–98° C. under 0.05 mm. Hg. It is unstable in the air. Its analysis for $C_{14}H_{24}N_2O$ (M.W.=236.35) gives:
Calculated: N=11.85%. Found: N=12.08%.

In solution in ether, it gives, on the addition of an alcoholic solution of hydrochloric acid, a hydrochloride which is purified by recrystallization from methyl ethyl ketone. This hydrochloride is stable and melts at 166° C. Its analysis for $C_{14}H_{24}N_2O \cdot HCl$, gives:
Calculated: C=61.63%, H=9.23%, N=10.25%, Cl=13.02%. Found C=61.55%, H=9.15%, N=10.25%, Cl=12.85%.

EXEMPLE 13

1 - gamma - dimethylaminopropyl - 2 - alpha-ethylbutyrylpyrrole

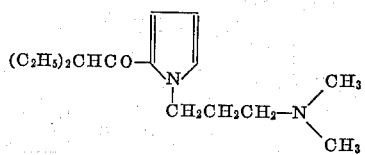

This base is obtained by the action of 1-chloro-3-dimethylaminopropane on the potassium derivative of 2-alpha-ethylbutyrylpyrrole. It is an unstable oil which boils at 97–100° C. under 0.05 mm. Hg. Its analysis for $C_{15}H_{26}N_2O$ (M.W.=250.37) gives:
Calculated: N=11.19%. Found: N=11.09%.

The hydrochloride, prepared as in the preceding example, is stable and, when recrystallized from methyl ethyl ketone, melts at 122° C. Its analysis for $C_{15}H_{26}N_2O \cdot HCl$ gives:
Calculated: C=62.81%, H=9.48%, N=9.76%, Cl=12.37%. Found: C=63.09%, H=9.52%, N=9.70%, Cl=12.39%.

EXAMPLE 14

Condensation of 1-dimethylamino - 2 - chloropropane with the potassium derivative of 2-alpha-ethylbutyrylpyrrole gives a base which boils at 104–106° C. under 0.09 mm. Hg. Its analysis for $C_{15}H_{26}N_2O$ (M.W.=250.37) gives:

Calculated: C=71.95%, H=10.47%, N=11.19%.
Found: C=71.69%, H=10.54%, N=11.10%.

This product may consist of either or both of the isomers:

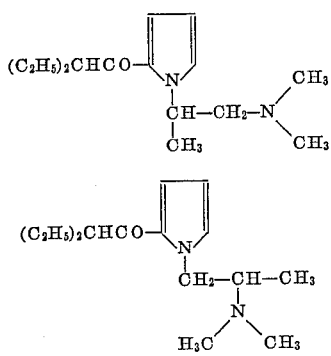

An ethereal solution of the product, treated with alcoholic hydrochloric acid, gives a hydrochloride which melts at 116° C. when recrystallized from ethyl acetate.

EXAMPLE 15

*1-(beta-N-morpholyl)ethyl-2-alpha-ethylbutyrylpyrrole*

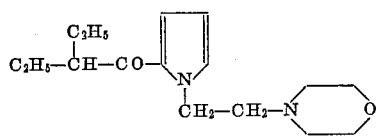

This product is obtained in accordance with the method of Example 1 by the action of 1-chloro-2-N-morpholylethane on the potassium derivative of 2 - alpha-ethylbutyrylpyrrole. It is an oil boiling at 127–132° C. under 0.05 mm. Hg.

Analysis. — for $C_{16}H_{26}N_2O_2$ (278.38). Calculated: 69.03=O%, 9.41=H%, 10.06=N%. Found:

68.86=O%, 9.35=H%, 10.05=N%

9.35=H%, 10.05=N%.

The hydrochloride (recrystallized from ethyl acetate) melts at 142° C.

EXAMPLE 16

*1-(beta-N-piperidyl)ethyl-2-alpha-ethylbutyrylpyrrole*

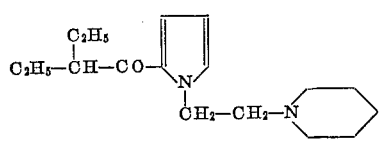

This product is obtained in accordance with the method of Example 1 by the action of 1-chloro-2-N-piperidylethane on the potassium derivative of 2-alpha-ethylbutyrylpyrrole. It is an oil boiling at 121–125° C. under 0.06 mm. Hg.

Analysis. — for $C_{17}H_{28}N_2O$ (276.4). Calculated: 73.86=O%, 10.21=H%, 10.14=N%. Found:

73.90=O%, 10.16=H%, 9.98=N%

EXAMPLES 17 to 65

Other halogenated tertiary amines were reacted with other potassium derivatives of 2 - pyrrylketones by the method of Example 1, and the products obtained and their constants are shown in Table I. The halogenated tertiary amines are chosen from the following: 1 - chloro - 2 -dimethylaminoethane, 1 - chloro - 2 - diethylaminoethane, 1 - chloro - 2 - N - morpholylethane, 1-chloro - 2 - N - piperidylethane, 1 - chloro - 3 - dimethylamino-propane and 2-chloro-1-dimethylaminopropane.

The 2-pyrrylketones are chosen from the following: 2-p-chlorobenzoylpyrrole, 2 - phenylacetylpyrrole (M.P. 93° C.), 2-p-fluorobenzoylpyrrole (M.P. 104° C.), 2-o-fluorobenzoylpyrrole (M.P. 76° C.), 2-(2'-methoxy-5'-bromo)benzoylpyrrole (M.P. 129° C.), 2-p-chlorophenoxy-acetylpyrrole (M.P. 98° C.), 2-phenoxyacetylpyrrole (M.P. 90° C.), 2-o-methoxybenzoylpyrrole (M.P. 132° C.), 2-m-methoxybenzoylpyrrole (M.P. 80° C.), 2-o-toluylpyrrole (M.P. 68° C.), 2-formylpyrrole, 2-acetylpyrrole, 2-nicotinoylpyrrole, 2-isonicotinoylpyrrole and 2-thenoylpyrrole.

TABLE I

General formula of the compounds prepared:

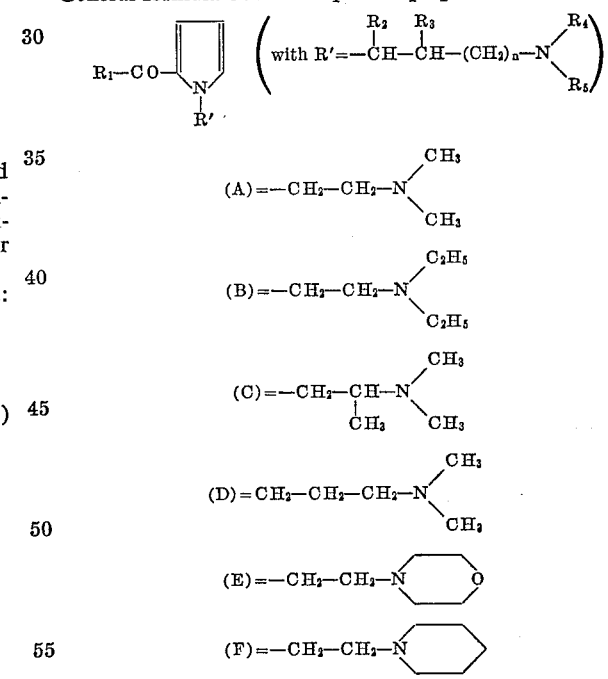

and

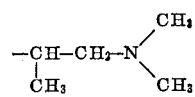

| Ex. No. | R₁ | R′ | Empirical formula; molecular weight | B.P. (° C.)/ mm. Hg | Analyses | Salts |
|---|---|---|---|---|---|---|
| 17 | —CH₃ | A | $C_{10}H_{16}N_2O$ (180.2) | 71–75/0.06 | Calc.—C: 66.63, H: 8.95, N: 15.54; Found—C: 66.93, H: 9.10, N: 15.30. | Hydrochloride, M.P. 208–210° C. |
| 18 | —CH₃ | B | $C_{12}H_{20}N_2O$ (208.3) | 95–100/0.5 | Calc.—N: 13.45; Found—N: 13.60 | HCl, M.P. 129° C. |
| 19 | —CH₃ | C | $C_{11}H_{18}N_2O$ (194.3) | 86/0.4 | Calc.—N: 14.42; Found—N: 14.23 | HCl, M.P. 120° C. |
| 20 | H | A | $C_9H_{14}N_2O$ (166.22). | 101/5 | Calc.—C: 65.03, H: 8.49, N: 16.85; Found—C: 65.08, H: 8.70, N: 16.70. | Citrate, M.P. 124° C. |
| 21 | H | B | $C_{11}H_{18}N_2O$ (194.3) | 128/10 | Calc.—C: 68.0, H: 9.34, N: 14.42; Found—C: 67.7, H: 9.45, N: 14.48. | Citrate, M.P. 114° C. |
| 22 | H | C | $C_{10}H_{16}N_2O$ (180.24). | 129/13 | Calc.—C: 66.63, H: 8.95, N: 15.54; Found—C: 66.25, H: 9.06, N: 15.35. | Citrate, M.P. 128° C. |
| 23 | H | D | $C_{10}H_{16}N_2O$ (180.24). | 117/7 | Calc.—C: 66.63, H: 8.95, N: 15.54; Found—C: 66.65, H: 8.93, N: 15.44. | Citrate, M.P. 80–82° C. |

| Ex. No. | R¹ | R' | Empirical formula; molecular weight | B.P. (° C.)/mm. Hg | Analyses | Salts |
|---|---|---|---|---|---|---|
| 24 | Cl—⟨phenyl⟩— | A | $C_{15}H_{17}ClN_2O$ (276.7). | 155/0.2 M.P. 50° | Calc.—C: 65.05, H: 6.18, N: 10.12; Found—C: 64.9, H: 6.30, N: 10.30. | ClH, 175° C. |
| 25 | Same as example 24 | B | $C_{17}H_{21}ClN_2O$ (276.75). | 175/0.3 | Calc.—C: 67.01, H: 6.94, N: 9.18; Found—C: 66.97, H: 7.02, N: 9.26. | ClH, 145°. |
| 26 | do | C | $C_{16}H_{19}ClN_2O$ (290.77). | 170/0.4 | Calc.—C: 66.09, H: 6.54, N: 9.64; Found—C: 66.19, H: 6.53, H: 9.64. | ClH, M.P. 185° C. |
| 27 | do | D | $C_{16}H_{19}ClN_2O$ (290.77). | 159/0.2 | Calc.—C: 66.09, H: 6.54, N: 9.64; Found—C: 65.96, H: 6.70, N: 9.74. | ClH, M.P. 165°. |
| 28 | do | E | $C_{17}H_{19}ClN_2O_2$ (318.8). | 189/0.1 | Calc.—C: 64.00, H: 6.00, N: 8.78; Found—C: 63.70, H: 6.04, N: 8.64. | ClH, M.P. 205°. |
| 29 | do | F | $C_{18}H_{21}ClN_2O$ (316.8). | 186/0.1 | Calc.—C: 68.23, H: 6.68, N: 8.84; Found—C: 68.45, H: 6.79, N: 8.62. | ClH, M.P. 175°. |
| 30 | ⟨2-F-phenyl⟩— | A | $C_{15}H_{17}FN_2O$ (260.3). | 147/0.06 | Calc.—C: 69.21, H: 6.58, N: 10.76; Found—C: 68.95, H: 6.23, N: 10.87. | ClH, 138°. |
| 31 | Same as example 30 | B | $C_{17}H_{21}FN_2O$ (288.4). | 139/0.04 | Calc.—C: 70.80, H: 7.33, N: 9.71; Found—C: 70.74, H: 7.08, N: 9.78. | ClH, M.P. 142°. |
| 32 | do | C | $C_{16}H_{19}FN_2O$ (274.3). | 137/0.09 | Calc.—C: 70.06, H: 6.98, N: 10.21; Found—C: 70.22, H: 6.71, N: 10.13. | ClH, M.P. 146°. |
| 33 | do | E | $C_{17}H_{19}FN_2O_2$ (302.3). | 185/0.6 | Calc.—C: 67.53, H: 6.33, N: 9.26; Found—C: 67.81, H: 6.03, N: 9.24. | ClH, M.P. 204°. |
| 34 | F—⟨phenyl⟩— | A | $C_{15}H_{17}FN_2O$ (260.3). | 140/0.05 | Calc.—C: 69.21, H: 6.58, N: 10.76; Found—C: 69.00, H: 6.30, N: 10.98. | ClH, M.P. 188°. |
| 35 | Same as example 34 | B | $C_{17}H_{21}FN_2O$ (288.35). | 139/0.05 | Calc.—C: 70.80, H: 7.33, N: 9.71; Found—C: 70.90, H: 7.05, N: 9.55. | ClH, M.P. 158°. |
| 36 | do | C | $C_{16}H_{19}FN_2O$ (274.3). | 146/0.1 | Calc.—C: 70.06, H: 6.98, N: 10.21; Found—C: 69.91, H: 6.75, H: 10.38. | ClH, M.P. 173°. |
| 37 | ⟨2-OCH₃, 5-Br phenyl⟩— | A | $C_{16}H_{19}BrN_2O_2$ (351.24). | 178/0.07 | Calc.—C: 54.7, H: 5.49, N: 7.97; Found—C: 54.86, H: 5.62, N: 7.83. | ClH, M.P. 203°. |
| 38 | Same as example 37 | C | $C_{17}H_{21}BrN_2O_2$ (365.27). | 185/0.07 | Calc.—C: 55.89, H: 5.79, N: 7.66; Found—C: 55.96, H: 5.86, N: 7.62. | Citrate, M.P. 95°. |
| 39 | ⟨2-OCH₃-phenyl⟩— | A | $C_{16}H_{20}N_2O_2$ (272.34). | 164/0.3 | Calc.—C: 70.56, H: 7.40, N: 10.29; Found—C: 70.62, H: 7.69, N: 10.40. | ClH, M.P. 184°. |
| 40 | Same as example 39 | C | $C_{17}H_{22}N_2O_2$ (286.36). | 160/0.1 | Calc.—C: 71.30, H: 7.74, N: 9.78; Found—C: 71.17, H: 7.80, N: 9.78. | ClH, M.P. 129°. |
| 41 | ⟨3-OCH₃-phenyl⟩— | A | $C_{16}H_{20}N_2O_2$ (272.34). | 150/0.05 | Cal—C: 70.56, H: 7.40, N: 10.29; Found—C: 70.44, H: 7.41, N: 10.13. | ClH, M.P. 168°. |
| 42 | Same as Example 41 | C | $C_{17}H_{22}N_2O_2$ (286.36). | 157/0.07 | Calc—C: 71.30, H: 7.74, N: 9.78; Found—C: 71.15, H: 7.71, N: 9.91. | Citrate, M.P. 70°. |
| 43 | ⟨phenyl⟩—O—CH₂— | A | $C_{16}H_{20}N_2O_2$ (272.34). | 173/0.1 | Calc—C: 70.56, H: 7.40, N: 10.29; Found—C: 70.48, H: 7.57, N: 10.12. | ClH, 169° C. |
| 44 | Same as Example 43 | B | $C_{18}H_{24}N_2O_2$ (300.4). | 182/0.2 | Calc.—C: 71.97, H: 8.05, N: 9.33; Found—C: 71.67, H: 8.18, N: 9.34. | Citrate, M.P. 98°. |
| 45 | do | C | $C_{17}H_{22}N_2O_2$ (286.36). | 162/0.1 | Calc—C: 71.3, H: 7.74, N: 9.78; Found—C: 71.17, H: 7.92, N: 9.98. | HCl, M.P. 145°. |
| 46 | Cl—⟨phenyl⟩—O—CH₂— | A | $C_{16}H_{19}ClN_2O_2$ (306.8). | 183/0.1 | Calc—C: 62.63, H: 6.24, N: 9.13; Found—C: 62.87, H: 6.40, N: 9.13. | HCl, M.P. 215°. |
| 47 | Same as Example 46 | B | $C_{18}H_{23}ClN_2O_2$ (334.8). | 183/0.1 | Calc—C: 64.56, H: 6.92, N: 8.36; Found—C: 64.70, H: 7.10, N: 8.21. | HCl, M.P. 150°. |
| 48 | do | C | $C_{17}H_{27}ClN_2O_2$ (320.81). | 158/0.1 | Calc.—C: 63.64, H: 6.59, N: 8.73; Found—C: 63.83, H: 6.70, N: 8.58. | Maleate, M.P. 130°. |
| 49 | ⟨2-CH₃-phenyl⟩— | A | $C_{16}H_{20}N_2O$ (256.34). | 143/0.5 | Calc—C: 74.96, H: 7.86, N: 10.93; Found C: 74.42, H: 7.90, N: 10.91. | Citrate, M.P. 118°. |
| 50 | Same as Example 49 | B | $C_{18}H_{24}N_2O$ (284.4). | 127/0.04 | Calc—C: 76.02, H: 8.51, N: 9.85; Found C: 75.91, H: 8.55, N: 9.94. | Citrate, M.P. 123°. |
| 51 | do | C | $C_{17}H_{22}N_2O$ (270.36). | 140/0.5 | Calc—C: 75.52, H: 8.20, N: 10.36; Found—C: 75.77, H: 8.27, N: 10.33. | Citrate, M.P. 72°. |
| 52 | ⟨phenyl⟩—CH₂— | A | $C_{16}H_{20}N_2O$ (256.34). | 160/0.05 | Calc.—C: 74.96, H: 7.86, N: 10.93; Found—C: 74.88, H: 7.95, N: 10.78. | HCl, 156°. |

| Ex. No. | R¹ | R' | Empirical formula; molecular weight | B.P. (° C.)/ mm. Hg | Analyses | Salts |
|---|---|---|---|---|---|---|
| 53 | Same as Example 52 | B | $C_{18}H_{24}N_2O$ (284.39) | 165/0.05 | Calc.—C: 76.02, H: 8.51, N: 9.85; Found—C: 76.30, H: 8.59, N: 9.96. | HCl, 92°. |
| 54 | do | C | $C_{17}H_{22}N_2O$ (270.36) | 140/0.05 | Calc.—C: 75.52, H: 8.20, N: 10.36; Found—C: 75.34, H: 8.25, N: 10.5. | Citrate, M.P. 95°. |
| 55 | do | D | $C_{17}H_{22}N_2O$ (270.36) | 148/0.05 | Calc.—C: 75.52, H: 8.20, N: 10.36; Found—C: 75.25, H: 8.27, N: 10.33. | HCl, M.P. 165°. |
| 56 | do | E | $C_{16}H_{22}N_2O_2$ (298.37) | 190/0.4 M.P. 55° | Calc.—C: 72.45, H: 7.43, N: 9.39; Found—C: 72.14, H: 7.48, N: 9.39. | HCl, M.P. 150°. |
| 57 | do | F | $C_{19}H_{24}N_2O$ (296.4) | 178/0.4 | Calc.—C: 76.99, H: 8.16, N: 9.45; Found—C: 76.40, H: 8.17, N: 9.46. | HCl, M.P. 165°. |
| 58 |  | A | $C_{13}H_{16}NOS$ (248.27) | 132/0.07 | Calc.—C: 62.89, H: 6.50, N: 11.28; Found—C: 62.52, H: 6.59, N: 11.16. | Citrate, M.P. 112°. |
| 59 | Same as Example 58 | B | $C_{15}H_{20}N_2OS$ (276.33) | 139/0.03 | Calc.—C: 65.19, H: 7.30, N: 10.14; Found—C: 65.02, H: 7.35, N: 9.91. | HCl, M.P. 151°. |
| 60 | do | C | $C_{14}H_{18}N_2OS$ (262.28) | 142/0.05 | Calc.—C: 64.10, H: 6.92, N: 10.68; Found—C: 64.01, H: 7.07, N: 10.63. | Citrate, M.P. 74–76° |
| 61 | 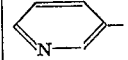 | A | $C_{14}H_{17}N_3O$ (243.3) | 145/0.06 | Calc.—C: 69.11, H: 7.04, N: 17.27; Found—C: 58.9, H: 7.23, N: 17.52. | Citrate, M.P. 128°. |
| 62 | Same as Example 61 | B | $C_{16}H_{21}N_3O$ (271.35) | 165/0.1 | Calc.—C: 70.82, H: 7.8, N: 15.49; Found—C: 70.87, H: 7.86, N: 15.49. | Citrate, M.P. 156°. |
| 63 | do | C | $C_{15}H_{19}N_3O$ (257.33) | 146/0.05 | Calc.—C: | Citrate, M.P. 110–113°. |
| 64 | 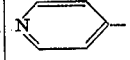 | A | $C_{14}H_{17}N_3O$ (243.3) | 127/0.05 | Calc.—C: 69.11, H: 7.04, N: 17.27; Found—C: 69.50, H: 6.96, N: 17.36. | Citrate, M.P. 106–10°. |
| 65 | Same as Example 64 | C | $C_{25}H_{19}N_3O$ (257.33) | 143/0.07 | Calc.—C: 70.00, H: 7.44, N: 16.33; Found—C: 69.80, H: 7.50, N: 16.54. | |

In addition, the pharmacological properties of the compounds of the invention were studied.

In the first place, their acute toxicity was studied by determining their $LD_{50}$ by the intravenous route in the mouse.

The action of the compounds on the central nervous system was also studied by means of various tests.

The compounds generally exhibited little activity in the traction and rota-rod tests, though the hydrochloride of the compound of Example 1 had some activity in a dosage of 50 mg./kg. injected intraperitoneally in mice.

The hydrochloride of Example 1, again in the same dosage of 50 mg./kg. by the intraperitoneal route, also proved active in reinforcing barbituric narcosis.

The various compounds of the invention have some analgesic effect in dosages of 30 to 60 mg./kg. injected into the mouse by the intraperitoneal route. This action was determined by Eddy's method, in which batches of mice are placed on plates heated at 50° C. and the licking of the front paws is examined. In particular, the hydrochlorides of Examples 2 and 5 exhibited a very favorable action.

Moreover, the spasmolytic activity of the compounds of the invention was studied by examining the antagonism to acetylchloride and to barium chloride on the isolated duodenum of the rat, and the compounds exhibited appreciable activity.

Fnally, their anti-tussive activity was investigated by Domenjoz's technique in the cat.

The hydrochlorides of the compounds of Examples 1, 2 and 4 had a distinct anti-tussive action in a dosage of 5 mg./kg. injected intravenously.

The product of Example 27 is a respiratory analeptic in a dosage of 5 mg./kg.

The pharmacological properties of the compounds of the invention are listed in the following Table II.

TABLE II

| Ex. No. | $LD_{50}$, mg./kg. | Anti-tussive action, mg./kg., by intravenous route | | Other actions |
|---|---|---|---|---|
| | | Cat | Guinea Pig | |
| 1 | 22 | 5 | | Spasmolytic: $BaCl_2$ $6.10^{-6}$) Acetylcholine ($6^2 \times 10^{-6}$). |
| 2 | 32 | 5 | | |
| 3 | 128 | >10 | | Anthihistaminic action ($2 \times 10^{-5}$). |
| 4 | 19 | 5 | 5 | Antihistaminic ($6 \times 10^{-6}$). |
| 5 | 46 | >5 | | |
| 6 | 45 | 2.5 | 5 | Spasmolytic: $BaCl_2$ ($3 \times 10^{-5}$), Acetylcholine ($2.10^{-5}$), Antihistaminic ($5.5 \times 10^{-5}$). |
| 7 | 24.5 | 5 | 5 | Spasmolytic: $BaCl_2$ ($6.10^{-6}$), Acetylcholine ($6.10^{-6}$). |
| 8 | 14 | 2.5 | 5 | |
| 9 | 76 | 5 | 5 | |
| 11 | 23 | 2.5 | 2.5 | |
| 12 | 13 | 2.5 | | |
| 13 | 38 | 5 | 5 | Spasmolytic: $BaCl_2$ ($6.10^{-6}$), Acetylcholine ($6.10^{-6}$). |
| 14 | 35 | 5 | 5 | |
| 15 | 90 | >5 | | Spasmolytic: $BaCl_2$ ($5.3 \times 10^{-6}$), Acetylcholine ($1.10^{-5}$). |
| 17 | 30 | 3 | | Spasmolytic: $BaCl_2$ ($6 \times 10^{-6}$), Acetylcholine ($4.10^{-5}$). |
| 19 | 55 | 5 | | Spasmolytic: $BaCl_2$ ($6.10^{-6}$), Acetylcholine ($6.10^{-6}$). |

TABLE II—Continued

| Ex. No. | $LD_{50}$, mg./kg. | Anti-tussive action, mg./kg., by intravenous route | | Other actions |
|---|---|---|---|---|
| | | Cat | Guinea Pig | |
| 24 | 48 | 2.5 | Inactive | Spasmolytic: $BaCl_2$ $(3.10^{-6})$, Acetylcholine $(6.10^{-5})$. |
| 25 | 55 | 2.5 | 5 | Spasmolytic: $BaCl_2$ $(2.10^{-6})$, Acetylcholine $(3.10^{-6})$. |
| 26 | 55 | 5 | 5 | Spasmolytic: $BaCl_2$ $(1.6 \times 10^{-6})$, Acetylcholine $(5.10^{-6})$. |
| 27 | 55 | 5 | Inactive | Spasmolytic: $BaCl_2$ $(2.10^{-6})$, Acetylcholine $(2.10^{-6})$. |
| 28 | 140 | 10 | Inactive | |
| 30 | 23 | 2 | 1 | |
| 31 | 19 | 2 | 2 | Spasmolytic: $BaCl_2$ $(2.10^{-6})$, Acetylcholine $(1.3 \times 10^{-5})$. |
| 32 | 20 | 2 | Inactive | Spasmolytic: $BaCl_2$ $(2.10^{-6})$, Acetylcholine $(1.3 \times 10^{-5})$. |
| 33 | 139 | 13 | Inactive | |
| 34 | 39 | 2 | Inactive | |
| 35 | 36 | 3 | Inactive | Spasmolytic: $BaCl_2$ $(4.6 \times 10^{-6})$, Acetylcholine $(6.10^{-6})$. |
| 36 | 40 | 4 | | Spasmolytic: $BaCl_2$ $(6.10^{-6})$, Acetylcholine $(3.10^{-5})$. |
| 38 | 41 | 2.5 | Inactive | |
| 39 | 28 | 3 | Inactive | Spasmolytic: $BaCl_2$ $(6.10^{-6})$, Acetylcholine $(6.10^{-6})$, analgesic (30 mg./kg.), by subcutaneous route. |
| 40 | 28 | 3 | Inactive | Spasmolytic: $BaCl_2$ $(3.10^{-6})$, Acetylcholine $(6.10^{-6})$, analgesic (30 mg./kg.), by subcutaneous route. |
| 41 | 14.5 | 1.5 | Inactive | Spasmolytic: $BaCl_2$ $(3.10^{-5})$, Acetylcholine $(6.10^{-6})$. |
| 42 | 31 | 3 | | |
| 46 | 22 | 2 | Inactive | Spasmolytic: $BaCl_2$ $(2.10^{-6})$, Acetylcholine $(1.3 \times 10^{-5})$. |
| 47 | 9.5 | 1 | 1 | Spasmolytic: $BaCl_2$ $(2.10^{-6})$, Acetylcholine $(1.3 \times 10^{-5})$. |
| 48 | 25 | 2.5 | Inactive | |
| 49 | 31 | 2 | Inactive | |
| 50 | 26 | 2.5 | Inactive | |
| 51 | 41 | 4 | Inactive | |
| 53 | 15 | 1.5 | 1.5 | Spasmolytic: $BaCl_2$ $(2.6 \times 10^{-5})$, Acetylcholine $(3.10^{-6})$. |
| 54 | 40 | 2 | 2 | |
| 56 | 50 | 5 | Inactive | Local anaesthetic. |
| 61 | 17.5 | 2 | Inactive | |
| 62 | 23.5 | 2.5 | 2.5 | |
| 63 | 29 | 3 | 3 | |
| 64 | 16 | 1.5 | Inactive | |
| 65 | 3.5 | 3.5 | | |

1-dimethylaminoisopropyl-2-benzoylpyrrole citrate, obtained in Example 6, has interesting pharmacological properties, of which the anti-tussive and analgesic activities may be mentioned:

PHARMACODYNAMIC TECHNIQUES EMPLOYED (a) *Acute toxicity*:

The $LD_{50}$ was determined in the mouse by the intravenous, intraperitoneal, per os and subcutaneous routes.

(b) *Anti-tussive activity* was determined by:

(1) Electrical stimulation of the superior laryngeal nerve in the cat (Domenjoz's method), the product being administered by the intravenous route.

(2) Electrical stimulation of the superior laryngeal nerve in the cat, the product being administered by the intrastomachic route.

(3) Mechanical excitation of the trachea of the guinea pig.

(4) Stimulation of the trachea in the non-anaesthetized dog.

(c) *Spasmolytic activity* to acetylcholine and barium chloride was determined on the isolated duodenum of the rat.

(d) *Action on the central nervous system* was determined by:
  Potentiation of hypnosis due to hexobartial
  Analgesia (Eddy's method)
  Anti-convulsive activity
  Respiration in the non-anaesthetized rabbit.

(e) *Activity on the peripheral nervous system* was determined by:

Local anaesthesia (Regnier's method) on the cornea of the rabbit, Curarising.

(f) *Activity on the autonomatic and cardiovascular nervous system.*

(g) *Activity on the digestive tube.*

*Results.*—The results of the above mentioned pharmacodynamic tests are given in Table III.

*Sub-acute toxicity*:

This product formed the subject of a test for sub-acute toxicity lasting for one month in the rat.

For this purpose, this product was administered in dosages of 25, 100 and 200 mg./kg. for 6 days out of 7 to batches of male and female rats. The growth of the animals was observed throughout the test, the blood counts and the blood formulae being established at the end of the treatment. After one month, the rats were sacrificed and subjected to a post-mortem examination. The various organs were extracted and weighed and histological preparations were made therefrom for the purpose of a pathological anatomical study.

*Result*

No mortality.

Comparable weight increases in the treated animals and the controls.

The blood counts made at the end of the experiment were comparable in the controls and in the treated animals.

A depressive action on the central nervous system was observed.

No macroscopic change was observed in the postmotem examination, the mean weight of the organs of the treated animals showing no significant difference from that of the control animals.

The product of Example 6 is therefore endowed with a marked anti-tussive action, while having no important secondary action. The vasodilatory action and the analgesic action may be pointed out. On the other hand, a study of the sub-acute toxicity in the rat during one month showed that the product was well tolerated. A slight depressive action on the central nervous system may be pointed out.

$n$ is one of the numerals 0 and 1; and $R_4$ and $R_5$ are members selected from the group consisting of alkyl having 1 to 5 carbon atoms and $R_4$ and $R_5$ together with the nitrogen atom to which they are attached, forming the morpholine, pyrrolidine, and piperidine ring;

and their pharmaceutically acceptable acid addition salts.

2. 1-β-dimethylamino ethyl-2-benzoyl pyrrole.
3. 1-β-diethylamino ethyl-2-benzoyl pyrrole.
4. 1-β-N-piperidyl ethyl-2-benzoyl pyrrole.

TABLE III

| $LD_{50}$, mg./kg. | Anti-tussive dose, mg./kg. | Central Nervous System | | | Peripheral Nervous System | | Autonomic and Cardiovascular Nervous System | | | Digestive Tube | Miscellaneous |
|---|---|---|---|---|---|---|---|---|---|---|---|
| | | Respiration | potential hypnosis | Analgesia | Local Anaesthesia | Curarisation | S.C.V. | Smooth Muscles* | | | |
| | | | | | | | | $BaCl_2$ | A.C. | | |
| I.V. 45 | Cat, 2.5-5 I.V., 50 per os. | 4.5 ↓ 0 | 25→+ 50→+ | 50→+ | 5%→0 | 4.5 ↓ 0 | 4.5 ↓ no act. 0.5-1 ↓ peripheral vasodilation. | $3.10^{-5}$ | $2.10^{-5}$ | 100 per os constipation. | $10^{-5}$ antihistaminic. |
| I.P. 125 P.O. 302 S.C. 110 | Dog, 80-100 per os. Guinea Pig, 50± per os. 5 I.V. | | | | | | | | | | |

* Concentration of the bath which reduces by about 50% the contraction due to $BaCl_2$ or to acetylcholine.
Dosage in mg./kg.

We claim:
1. A 2-pyrryl ketone compound selected from the group consisting of a 2-pyrryl ketone compound of the formula

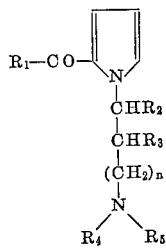

wherein
$R_1$ is a member selected from the group consisting of hydrogen, alkyl having 1 to 5 carbon atoms, phenyl, tolyl, methoxy phenyl, halogeno phenyl, phenoxy methyl, halogeno phenoxy methyl, benzyl, thienyl, and pyridyl;
$R_2$ and $R_3$ are members selected from the group consisting of hydrogen and alkyl having 1 to 5 carbon atoms;

5. 1-γ-dimethylamino propyl-2-benzoyl pyrrole.
6. 1-γ-dimethylamino propyl - 2 - (p-chloro benzoyl) pyrrole.
7. 1-dimethylamino isopropyl-2-benzoyl pyrrole.
8. The hydrochloride of 1-β-dimethylamino ethyl-2-benzoyl pyrrole.
9. The hydrochloride of 1-β-diethylamino ethyl-2-benzoyl pyrrole.
10. The hydrochloride of 1-γ-dimethylamino propyl-2-benzoyl pyrrole.
11. The hydrochloride of 1-β-N-piperidyl ethyl-2-benzoyl pyrrole.
12. The citrate of 1-dimethylamino isopropyl-2-benzoyl pyrrole.

References Cited

UNITED STATES PATENTS 3,249,624   5/1966   Karmas _____ 260—326.3

ALEX MAZEL, *Primary Examiner.*

JOSE TOVAR, *Examiner.*